No. 635,640. Patented Oct. 24, 1899.
G. A. BATES.
LINOTYPE AND MOLD THEREFOR.
(Application filed Dec. 6, 1898.)
(No Model.) 2 Sheets—Sheet 1.

On line 4-4

WITNESSES:
Arthur Ashley
F. A. Elmore

INVENTOR
G. A. Bates
BY
Phil. T. Dodge
ATTORNEY.

No. 635,640. Patented Oct. 24, 1899.
G. A. BATES.
LINOTYPE AND MOLD THEREFOR.
(Application filed Dec. 6, 1898.)
(No Model.) 2 Sheets—Sheet 2.
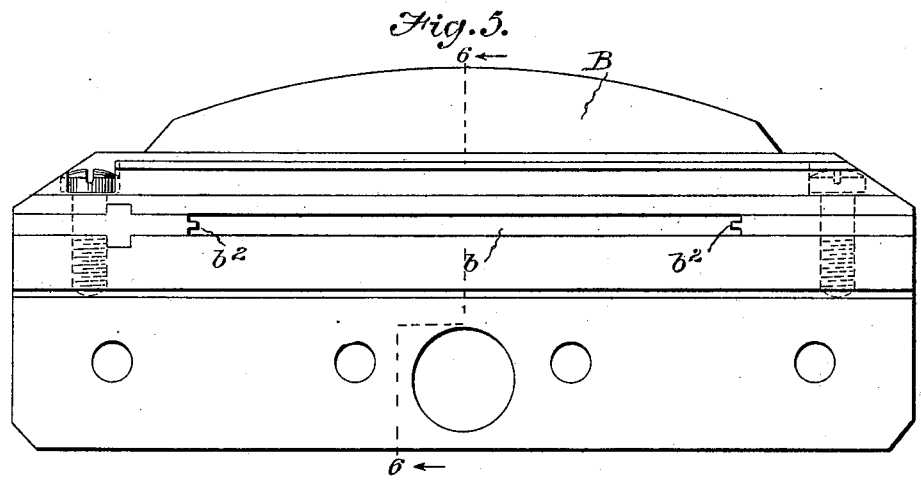
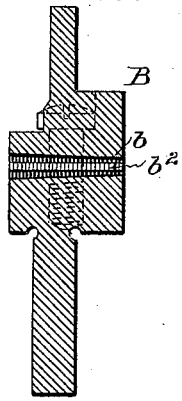
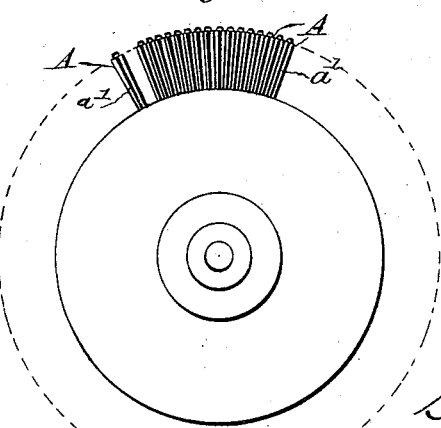
WITNESSES:
INVENTOR
G. A. Bates
BY
Phil T. Dodge
ATTORNEY.
THE NORRIS PETERS CO., PHOTO-LITHO., WASHINGTON, D. C.

UNITED STATES PATENT OFFICE.

GEORGE A. BATES, OF NEW YORK, N. Y., ASSIGNOR TO THE MERGENTHALER LINOTYPE COMPANY, OF NEW YORK.

LINOTYPE AND MOLD THEREFOR.

SPECIFICATION forming part of Letters Patent No. 635,640, dated October 24, 1899.

Application filed December 6, 1898. Serial No. 698,434. (No model.)

*To all whom it may concern:*

Be it known that I, GEORGE A. BATES, of New York, (Brooklyn,) county of Kings, and State of New York, have invented a new and useful Improvement in Linotypes and Molds Therefor, of which the following is a specification.

There are now in general use in the printing art printing bars or slugs known as "linotypes," which have on the edge the letters or characters to produce one line of print. As heretofore constructed these linotypes have parallel sides, or, in other words, are of uniform thickness, so that they may be locked up side by side to produce flat forms, resembling ordinary type-forms. Obviously these flat slugs cannot be advantageously used on revolving cylinders.

The object of my invention is to secure the production of slugs which are of tapering form in cross-section, so that they may be secured side by side around the surface of the printing-cylinder lengthwise thereof.

To this end the invention consists in linotype-slugs tapering in cross-section and provided with reduced surfaces at their ends, as hereinafter explained, and also in a mold having its cavity of tapering form in cross-section and having at its ends guides to support the slugs or linotypes as they are ejected therefrom.

Figure 1:
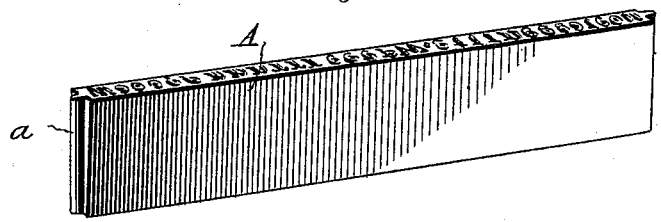
Figure 2:
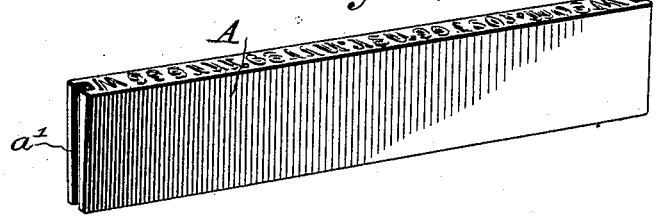
Figure 3:
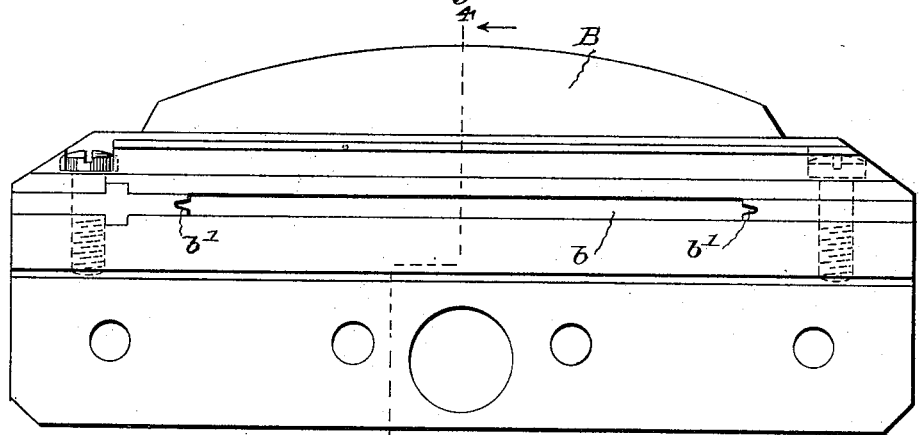
Figure 4:
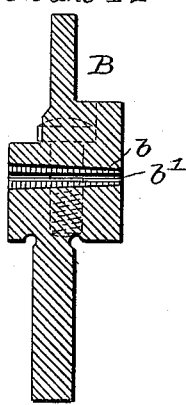

Referring to the accompanying drawings, Figures 1 and 2 are perspective views showing my improved linotype-slug in alternative or equivalent forms. Fig. 3 is a front view of a mold adapted for casting the slugs shown in Fig. 1. Fig. 4 is a cross-section of a mold on the line 4 4. Fig. 5 is a front view of a mold adapted for producing the slugs shown in Fig. 2. Fig. 6 is a cross-section on a line 6 6 of the preceding figure, and Fig. 7 is an end view illustrating the manner in which the slugs are applied to the printing-cylinder.

Referring to Figs. 1 and 2, A represents a type-metal slug or linotype cast complete in one piece and bearing on the upper edge in relief the characters to produce a line of print, the slugs being in this respect the same as those now in general use. Instead of being made, as usual, of uniform thickness from top to bottom, each of these slugs is tapered or reduced in thickness toward its base, the side faces being usually in lines which are radii of the cylinder on which they are to be used, so that when they are assembled side by side lengthwise on the cylinder they will fit snugly together, as shown in Fig. 7. At each end the slugs are extended slightly beyond the type-surfaces and reduced in section to form a vertical central guide—that is to say, a guide extending from the printing-surface or top of the slug downward to the base or bearing-surface.

In Fig. 1 the guide is in the form of a pointed or V-shaped rib $a$, extending from the top to the bottom surface, this rib being made of uniform size and shape from top to bottom, or practically so.

In the slug shown in Fig. 2 the guide is in the form of a groove $a'$, extending from the top to the bottom of the slug in its projecting end.

In each case the guide is preferably extended, as shown in the center of the slug, equally distant from the two faces; but it may be parallel with either face, if preferred.

The end guides are intended to support the slugs and prevent them from falling out of position as they leave the mold, as hereinafter referred to; but they also have in practice certain mechanical advantages, among others the fact that they coöperate with devices for retaining the slugs on the type-cylinder.

Referring to the mold for forming the slugs, (shown in Fig. 1,) it consists, as shown in Figs. 3 and 4, of a solid body B, having a slot or mold proper, $b$, cut therethrough from front to back, this slot being of the exact dimensions of the required slug, with grooves $b'$ at its ends to form the ribs or guides $a$ on the slug. The mold may be formed complete in one piece or built up, as usual, of top and bottom portions and intermediate liners at the ends, the parts being connected by screws, as shown in the drawings, or otherwise connected.

The mold shown in Fig. 5 is essentially the same as that above described, except that the ends of the slot or mold proper have the guides $b^2$ project inward to form the grooves in the slug.

It will of course be recognized that the guides $b'$ $b^2$ are equivalent or alternate constructions, it being immaterial whether the groove is formed in the mold and the rib on the slug or the rib formed in the mold and the groove on the slug. I believe myself to be the first to construct a tapered linotype or printing slug having guides at its end and the first to construct a mold adapted to form slugs.

The molds herein described are intended to be used in the ordinary Mergenthaler linotype-machine or other analogous machine in which the slugs or linotypes after being cast in a mold are driven therefrom by an ejector-blade.

The end guides serve to support the slugs as they are driven forward out of the molds and compel them to pursue a straight course. Were it not for these guides the slugs becoming loose in the mold as soon as they start would tip or fall out of position and be liable to interfere with the operation of the machine and to be mutilated. The ends of the slugs being reduced to form the guides offer less resistance to the clamping devices on the cylinder than they would if they were not reduced. For this reason the clamping devices engage the reduced or weakened ends and hold the same firmly without danger of springing or bending the body of the slug.

Having described my invention, what I claim is—

1. A linotype tapered in cross-section and provided with vertical guides at its ends.

2. A linotype straight on its printing-surface, tapered in cross-section, and provided at its ends with guides extending from the upper or printing edge downward toward the base, whereby the linotypes are guided in leaving the mold and reduced in substance at the ends, that they may be the more easily clamped.

3. A mold for linotypes having a cell or mold proper of tapering form in cross-section, and having the ends adapted substantially as described to form guides on the ends of the linotypes.

In testimony whereof I hereunto set my hand, this 21st day of November, 1898, in the presence of two attesting witnesses.

GEORGE A. BATES.

Witnesses:
F. W. DAVIS,
C. E. GRANT.